United States Patent [19]
Okada et al.
[11] Patent Number: 4,778,260
[45] Date of Patent: Oct. 18, 1988

[54] METHOD AND APPARATUS FOR DRIVING OPTICAL MODULATION DEVICE

[75] Inventors: Shinjiro Okada, Kawasaki; Masahiko Enari, Yokohama; Yutaka Inaba, Kawaguchi; Tsutomu Toyono, Yokohama, all of Japan

[73] Assignee: Canon Kabushiki Kaisha, Tokyo, Japan

[21] Appl. No.: 852,180

[22] Filed: Apr. 15, 1986

[30] Foreign Application Priority Data

Apr. 22, 1985 [JP] Japan ............................... 60-084380

[51] Int. Cl.⁴ .......................... G02F 1/13; G09G 3/18
[52] U.S. Cl. ................................ 350/350 S; 350/332; 350/333; 350/335; 340/765
[58] Field of Search .................... 350/350 S, 333, 332, 350/335; 340/784, 765

[56] References Cited

U.S. PATENT DOCUMENTS

| | | | |
|---|---|---|---|
| 3,787,834 | 1/1974 | Elliott | 350/332 |
| 3,895,372 | 7/1975 | Kaji et al. | 350/332 |
| 4,448,490 | 5/1984 | Shibuya et al. | 350/335 |
| 4,638,310 | 1/1987 | Ayliffe | 340/805 |
| 4,655,561 | 4/1987 | Kanbe et al. | 350/350 |
| 4,693,563 | 9/1987 | Harada et al. | 350/350 |

FOREIGN PATENT DOCUMENTS

| | | | |
|---|---|---|---|
| 2136185 | 9/1984 | United Kingdom | 350/332 |
| 2163273 | 2/1986 | United Kingdom | 350/350 S |

OTHER PUBLICATIONS

A. R. Kmetz, "Nonemissive Electrooptic Display", Plenum Press, New York, 1976, pp. 261-289.
T. B. Brody, J. A. Asars, G. D. Dixon, "A 6×6 Inch 20 Lines per Inch Liquid Crystal Display Panel", IEEE Trans. on Elect. Devices, vol. ED-20, No. 11, Nov. 1973.

*Primary Examiner*—Stanley D. Miller
*Assistant Examiner*—Huy V. Mai
*Attorney, Agent, or Firm*—Fitzpatrick, Cella, Harper & Scinto

[57] ABSTRACT

An improvement in a driving method for an optical modulation device having a plurality of picture elements arranged in N lines, each picture element including a pair of oppositely spaced electrodes, and an optical modulation material disposed therebetween and showing at least two stable states with respect to an electric field. A writing operation is carried out respectively for a plurality of blocks each comprising a plurality (n) of lines, the writing operation including: (a) a first step of applying such a voltage signal to picture elements arranged on the n lines as to provide the picture elements with a display state based on a first stable state of the optical modulation material, and (b) a second step of applying such a voltage signal to selected picture elements on the n lines line-by-line as to provide the selected picture elements with a display state based on a second stable state of the optical modulation material; wherein N and n are integers satisfying the relation of N>n.

13 Claims, 16 Drawing Sheets

METHOD AND APPARATUS FOR DRIVING OPTICAL MODULATION DEVICE

FIELD OF THE INVENTION AND RELATED ART

The present invention relates to a method and an apparatus for driving an optical modulation device having a memory characteristic, particularly, an optical modulation device having a memory characteristic adapted for a display apparatus, an image forming apparatus, etc.

Flat panel display devices have been and are being actively developed all over the world. Among these, a display device using liquid crystals has been fully accepted in small scale commercial use. However, it has been very difficult to develop a display device which has such a high resolution and a large picture area that is can substitute for a CRT (cathode ray tube) by means of a conventional liquid crystal system (e.g., those using a TN (twisted nematic) or DS (dynamic scattering) mode.

In order to overcome drawbacks with such prior art liquid crystal devices, the use of a liquid crystal device having bistability has been propoed by Clark and Lagerwall (e.g., Japanese Laid-Open Patent Appln. No. 56-107216, U.S. Pat. No. 4367924, etc.). In this instance, as the liquid crystals having bistability, ferroelectric liquid crystals having chiral smectic C-phase (SmC*) or H-phase (SmH*) are generally used. These liquid crystals have bistable states of first and second stable states with respect to an electric field applied thereto. Accordingly, bistable devices are different from optical modulation devices in which the above-mentioned TN-type liquid crystals are used, because the bistable liquid crystal molecules are oriented to first and second optically stable states with respect to one and the other electric field vectors, respectively. The characteristics of the liquid crystals of this type are such that they are oriented to either of two stable states at an extremely high speed and the states are maintained when an electric field is not supplied thereto. By making use of such properties, these liquid crystals having a chiral smectic phase can essentially eliminate a large number of problems with the prior art devices as described above.

However, this bistable liquid crystal device may still cause a problem, when the number of picture elements is extremely large and high speed driving is required. More specifically, if the threshold voltage required for providing a first stable state for a predetermined voltage application time is designated by $-V_{th1}$ and if the threshold voltage required for providing a second stable state is designated by $V_{th2}$ for a ferroelectric liquid crystal cell having bistability, a display state (e.g., "white") written in a picture element can be inverted to the other display state (e.g., "black") when a voltage is continuously applied to the picture element for a long period of time.

FIG. 1 shows the threshold characteristic of a bistable ferroelectric liquid crystal cell. More specifically, FIG. 1 shows the dependency of a threshold voltage ($V_{th}$) required for switching of the display states on the voltage application time when HOBACPC (showing the characteristic curve 11 in the figure) and DOBAMBC (showing curve 12) are respectively used as a ferroelectric liquid crystal.

As apparent from FIG. 1, the threshold voltage $V_{th}$ has a dependency on the application time, and the dependency is more marked or sharper as the application time becomes shorter. As will be understood from this fact, when the ferroelectric liquid crystal cell is applied to a device which comprises numerous scanning lines and is driven at a high speed, there is a possibility that even if a display state (e.g., bright state) has been given to a picture element at the time of scanning thereof, the display state is inverted to the other state (e.g., dark state) before the completion of the scanning of one whole picture area when an information signal below $V_{th}$ is continually applied to the picture element during the scanning of subsequent lines.

SUMMARY OF THE INVENTION

An object of the present invention is to provide a driving method for an optical modulation device having eliminated the problems encountered in the conventional liquid crystal display devices or optical shutters.

Another object of the present invention is to provide a driving method for an optical modulation device having a high response speed characteristic.

A further object of the present invention is to provide a driving method for an optical modulation device having a high density of picture elements.

A still further object of the present invention is to provide an apparatus for achieving the above described driving method for an optical modulation device.

According to the present invention, there is provided an improvement in a driving method for an optical modulation device comprising a plurality of picture elements arranged in N lines, each picture element comprising a pair of oppositely spaced electrodes, and an optical modulation material disposed therebetween and having at least two stable states with respect to an electric field. A writing operation is carried out respectively for a plurality of blocks each comprising a plurality (n) of lines, the writing operation including: (a) a first step of applying such a voltage signal to picture elements arranged on the n lines as to provide the picture elements with a display state based on a first stable state of the optical modulation material, and (b) a second step of applying such a voltage signal to selected picture elements on the n lines, line-by-line, so as to provide the selected picture elements with a display state based on a second stable state of the optical modulation material; wherein N and n are integers satisfying the relationship of $N > n$.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Initially, as an optical modulation material used in a driving method according to the present invention, a material showing at least two stable states, particularly one showing either a first optically stable state or a second optically stable state depending upon an electric field applied thereto, i.e., multi-stability or bistability with respect to the applied electric field, particularly a liquid crystal having the above-mentioned property, may be used.

Preferable liquid crystals having bistability which can be used in the driving method according to the present invention are smectic, particularly chiral smectic, liquid crystals having ferroelectricity. Among them, chiral smectic C (SmC*)- or H (SmH*)-phase liquid crystals are suitable therefor. These ferroelectric liquid crystals are described in, e.g., "LE JOURNAL DE PHYSIQUE LETTERS" 36 (L-69), 1975 "Ferroelectric Liquid Crystals"; "Applied Physics Letters" 36 (11) 1980, "Submicro Second Bistable Electrooptic Switching in Liquid Crystals", "Kotai Butsuri (Solid State Physics)" 16 (141), 1981 "Liquid Crystal", etc. Ferroelectric liquid crystals disclosed in these publications may be used in the present invention.

More particularly, examples of ferroelectric liquid crystal compound used in the method according to the present invention are decyloxybenzylidene-p'-amino-2-methylbutyl-cinnamate (DOBAMBC), hexyloxybenzylidene-p'-amino-2-chloropropylcinnamate (HOBACPC), 4-o-(2-methyl)-butylresorcylidene-4'-octylaniline (MBRA8), etc.

When a device is constituted by using these materals, the device may be supported with a block of copper, etc., in which a heater is embedded in order to realize a temperature condition where the liquid crystal compounds assume an SmC*- or SmH*-phase.

Further, a ferroelectric liquid crystal formed in a chiral smectic F phase, I phase, J phase or K phase may also be used in addition to those in an SmC* or SmH* phase in the present invention.

Figure 1:
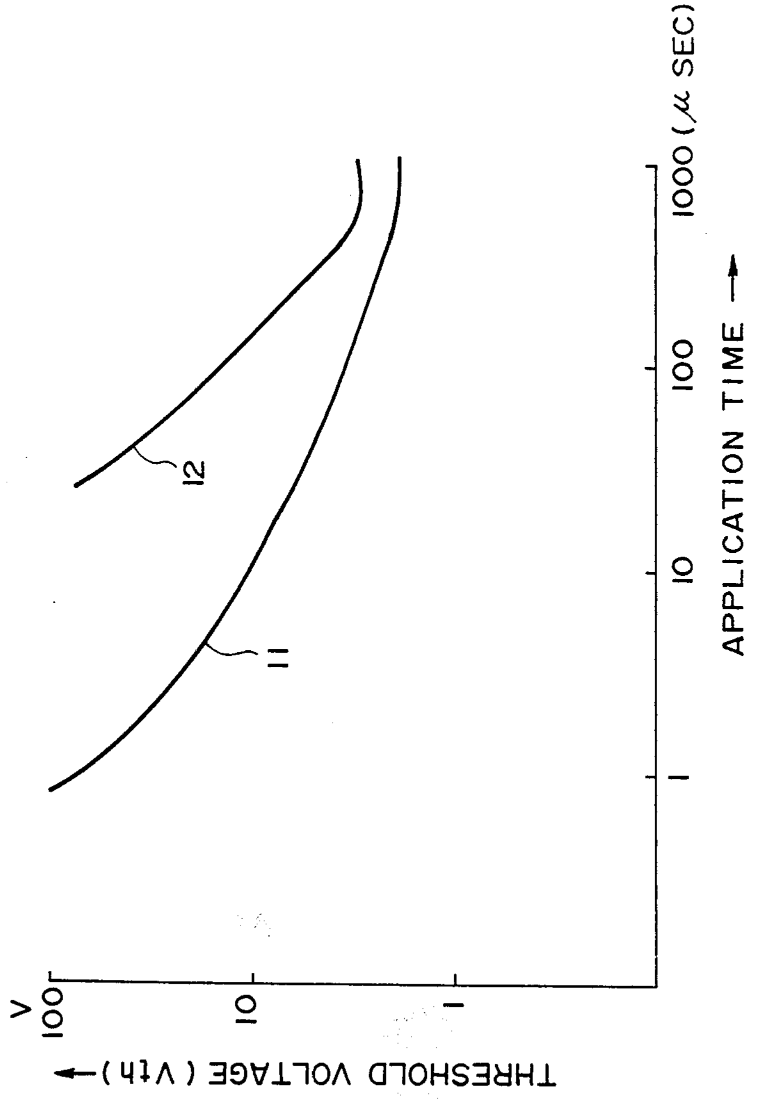
FIG. 1 shows threshold characteristic curves of ferroelectric liquid crystals.
Figure 2:
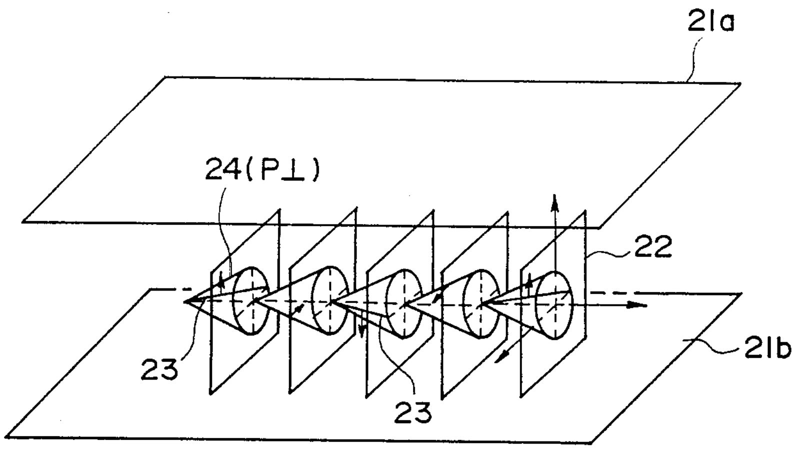
FIGS. 2 and 3 are schematic perspective views for illustrating the operation principle of the ferroelectric liquid crystal device used in the present invention.
Figure 3:
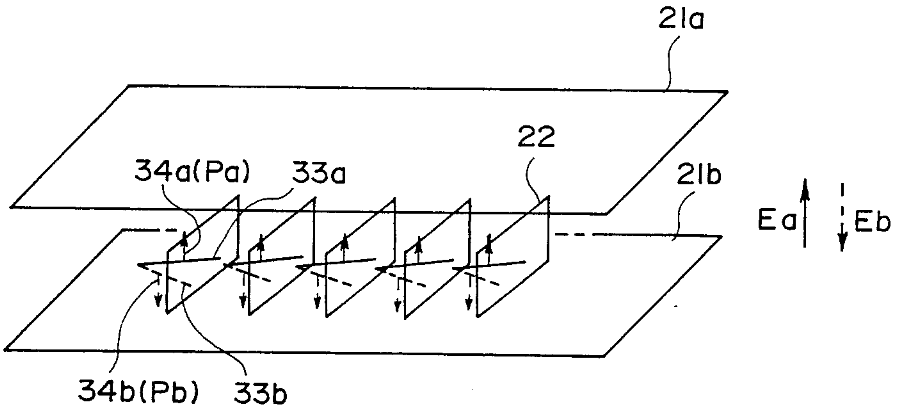

Referring to FIG. 2, there is schematically shown an example, of a ferroelectric liquid crystal cell. Reference numerals 21*a* and 21*b* denote base plates (glass plates) on which a transparent electrode of, e.g., $In_2O_3$, $SnO_2$, ITO (Indium Tim Oxide), etc., is disposed, respectively. A liquid crystal of an SmC*-phase in which liquid crystal molecular layers 22 are oriented perpendicular to surfaces of the glass plates is hermetically disposed therebetween. A full line 23 shows liquid crystal molecules. Each liquid crystal molecule 23 has a dipole moment ($P\perp$) 24 in a direction perpendicular to the axis thereof. When a voltage higher than a certain threshold level is applied between electrodes formed on the base plates 21*a* and 21*b*, the helical structure of the liquid crystal molecule 23 is loosened to change the alignment direction of respective liquid crystal molecules 23 so that the dipole moments ($P\perp$)24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device whose optical characteristics vary depending upon the polarity of the applied voltage. Further, when the thickness of the liquid crystal cell is sufficiently thin (e.g. $1\mu$), the helical structure of the liquid crystal molecules is loosened without the application of an electric field whereby the dipole moment assumes either of the two states, i.e., Pa in an upper direction 34*a* or Pb in a lower direction 34*b* as shown in FIG. 3. When electric field Ea or Eb higher than a certain threshold level and different from each other in polarity as shown in FIG. 3 is applied to a cell having the above-mentioned characteristics, the dipole moment is directed either in the upper direction 34*a* or in the lower direction 34*b* depending on the vector of the electric field Ea or Eb. In correspondence with this, the liquid crystal molecules are oriented in either of a first stable state 33*a* and a second stable state 33*b*.

When the above-mentioned ferroelectric liquid crystal is used as an optical modulation element, it is possible to obtain two advantages. First, the response speed is quite fast. Second, the orientation of the liquid crystal shows bistability. The second advantage will be further explained, e.g., with reference to FIG. 3. When the electric field Ea is applied to the liquid crystal molecules, they are oriented to the first stable state 33*a*. This state is kept stable even if the electric field is removed. On the other hand, when the electric field Eb having a direction opposite to that of the electric field Ea is applied thereto, the liquid crystal molecules are oriented to the second stable state 33*b*, whereby the directions of the molecules are changed. Likewise, the latter state is kept stable even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the cell is as thin as possible and generally 0.5 to $20\mu$, preferably 1 to $5\mu$.

Figure 4A:
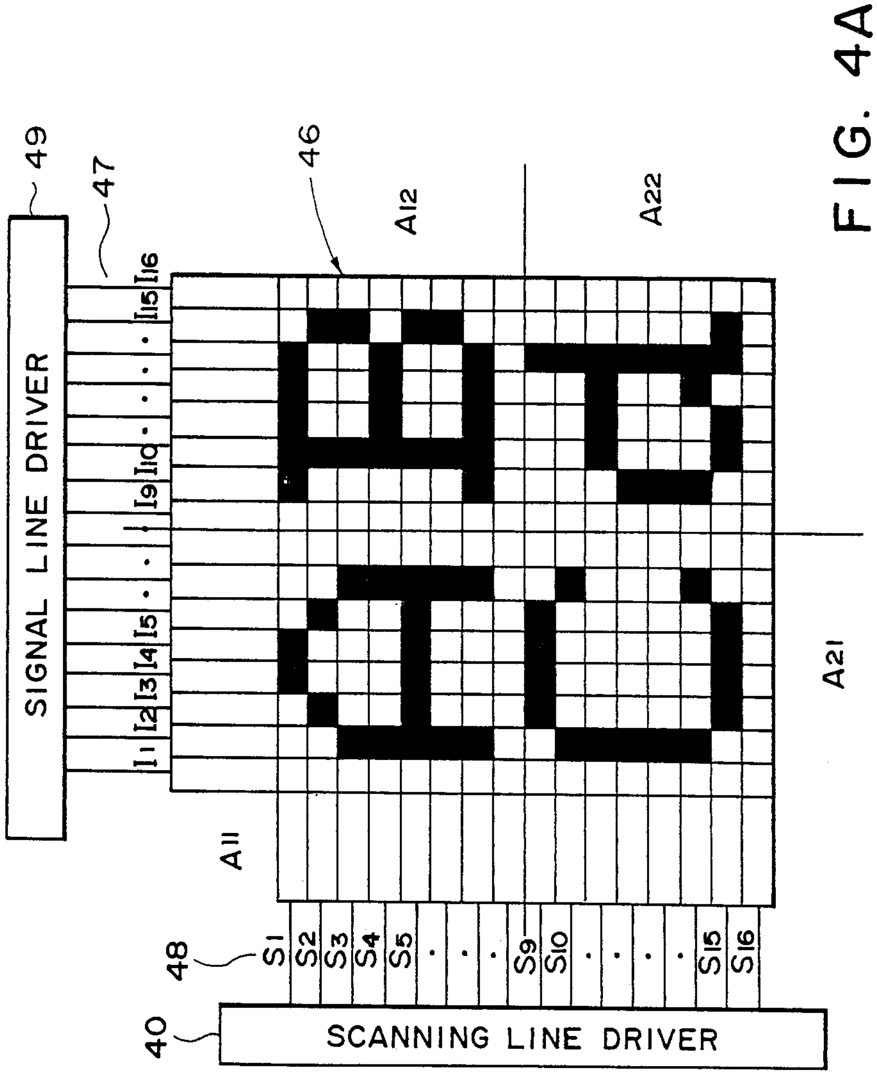
FIGS. 4A and 4B illustrate an arrangement of one example of the apparatus according to the present invention together with display states before and after rewriting.
Figure 4B:
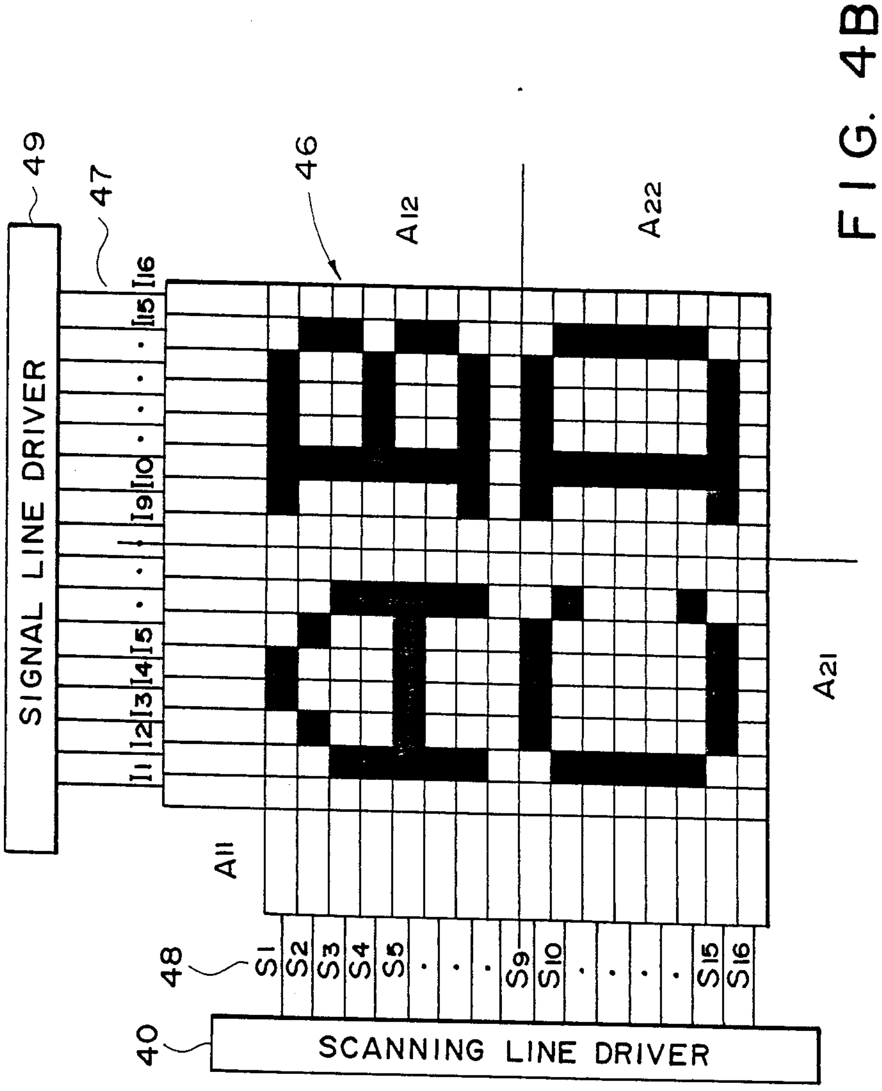

FIGS. 4A and 4B schematically illustrate an example of a matrix picture element structure suitable for practicing the present invention. FIG. 4A shows a display state before rewriting, and FIG. 4B shows a display state after the rewriting. Referring to the figures, a cell 46 comprises a matrix picture element structure comprising signal lines leading to signal electrodes 47 ($I_1$–$I_N$), scanning lines leading to scanning electrodes 48 ($S_1$–$S_N$), and a bistable optical modulation material disposed between the signal lines and the scanning lines. The number N of each group of electrodes is a positive integer, which is 16 in this example, for the brevity of explanation. The scanning lines are driven by a driver circuit 40 and the signal lines by a driver circuit 49. For easy explanation, the case where binary states of "white" and "black" are displayed is taken as an example. In FIGS. 4A and 4B, a picture element drawn in black represents a "black" state and a picture element shown in white represents a "white" state. Herein, it is assumed that 8×8 picture elements are used to display one character so tht the cell 46 may display 4 characters. As shown in FIG. 4A, "A" is displayed in a character region $A_{11}$, "B" in $A_{12}$, "C" in $A_{21}$, and "d" in $A_{22}$. Then, as shown in FIG. 4B, only the character region $A_{22}$ is rewritten into a capital letter "D". This operation will now be explained.

Figure 5:
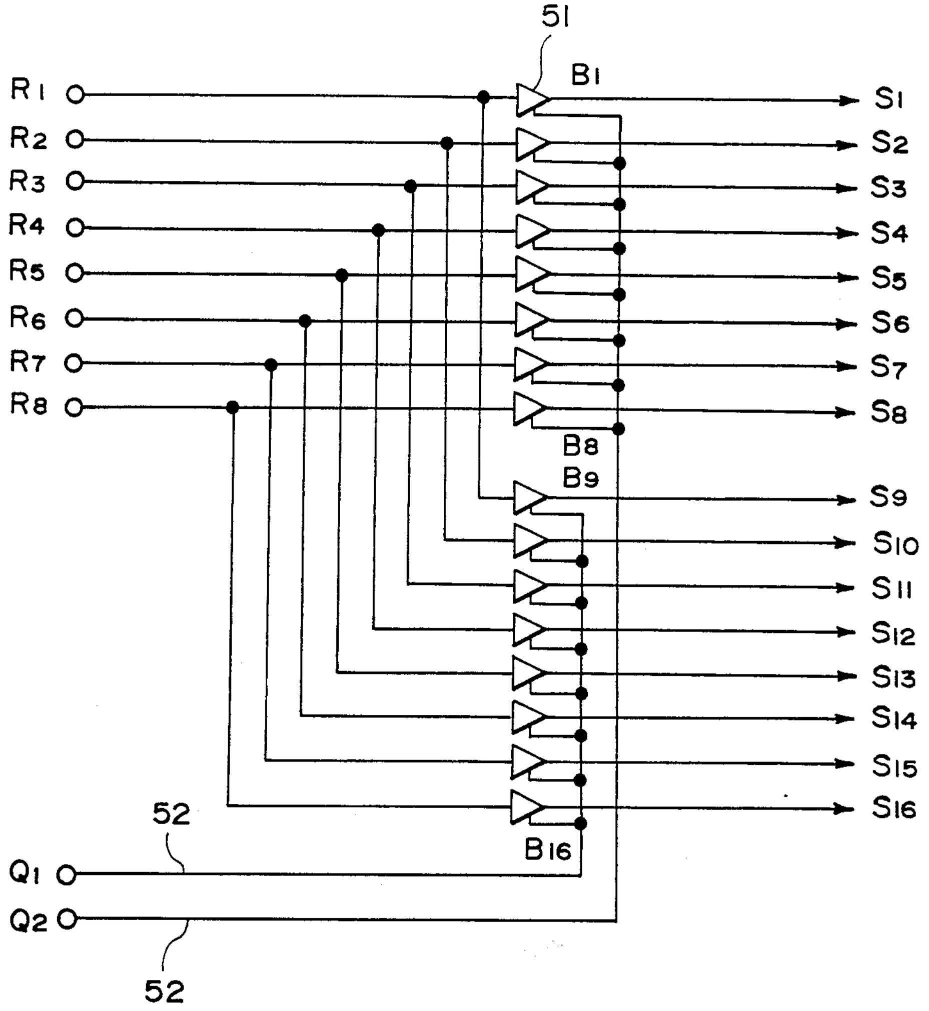
FIG. 5 is a partial circuit diagram of the output stage of a driver circuit according to the present invention.

FIG. 5 is a partial circuit diagram showing an example of the output stage of the above mentioned scanning line driver circuit. Referring to FIG. 5, buffers 51 include buffers $B_1$–$B_N$ (N=16 in this example) and the output levels are controlled by selection lines 52 through terminals $Q_1$–$Q_2$ when a terminal $Q_2$ is selected, the buffers $B_1$–$B_8$ are simultaneously turned on to transfer the levels of the terminals $R_1$–$R_8$ as they are to the terminals $S_1$–$S_8$, while the output lines $S_1$–$S_8$ are held at a prescribed constant level for maintaining the cell in the non-selected state when the terminal $Q_2$ is not selected. The terminal $Q_1$ has the same function as the terminal $Q_2$ for the buffers $B_9$–$B_{16}$.

Figure 6:
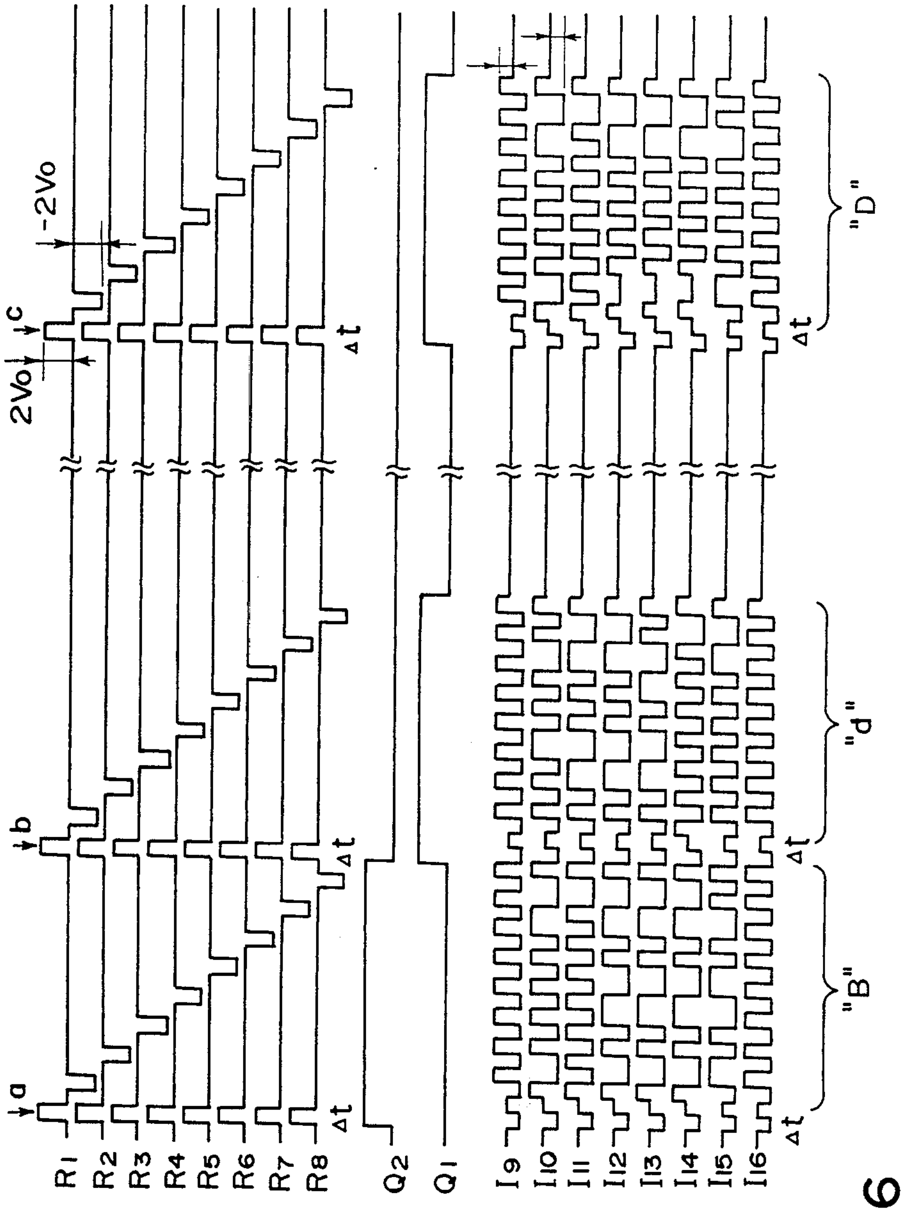
FIG. 6 is a signal time chart therefor.

FIG. 6 is a timing chart for the above mentioned output stage. Referring to FIG. 6, the threshold is defined as a pulse having a height of $2V_0$ for a duration of $\Delta t$, and writing is effected by applying a pulse above $2V_0$, e.g., $3V_0$. Now, the rewriting operation of the character region $A_{22}$ is explained, while the explanation of rewriting of the areas defined by the scanning lines $S_1$–$S_{16}$ and the signal lines $I_1$–$I_8$ is omitted. First, the terminal $Q_2$ is selected, and erasure signals are applied to the scanning lines $S_1$–$S_8$ and the signal lines $I_1$–$I_{16}$ at time a to write "white" in the character regions $A_{11}$ and $A_{12}$, respectively. Then, a selection signal is sequentially applied to the scanning lines $S_1$–$S_8$ to sequentially display the information signals on the signal lines $I_1$–$I_{16}$, whereby "A" is displayed in the region $A_{11}$ and "B" is displayed in region $A_{12}$. Then, $Q_1$ is selected, and erasure signals are applied to the scanning lines $S_9$–$S_{16}$ and the signal lines $I_1$–$I_{16}$ at time b to write "white" in both character regions $A_{21}$ and $A_{22}$. After that a selection pulse is sequentially applied to the scanning lines $S_9$–$S_{16}$ to sequentially display the information signals on the signal lines $I_1$–$I_{16}$, whereby "C" is displayed in $A_{21}$ and "d" in $A_{22}$. Now, in order to rewrite the character region $A_{22}$ in "D", as a subsequent step, $Q_1$ is selected at time c, erasure signals are applied to the scanning lines $S_9$–$S_{16}$ and the signal lines $I_9$–$I_{16}$. At this time, no erasure signal is applied to the signal lines $I_1$–$I_{16}$, so only the character region $A_{22}$ is made "white". Then, a selection pulse is sequentially applied to the scanning lines $S_9$–$S_{16}$, whereby the information signals on the signal lines $I_9$–$I_{16}$ are sequentially displayed. According to the above operation, the characters in the character regions $A_{11}$, $A_{12}$ and $A_{21}$ are retained, whereas only the character in the character region $A_{22}$ is rewritten into, e.g., "D".

The above example has been explained with reference to a binary signal display of "white" and "black". It is of course possible to also effect partial rewriting of any of multiple-level display, analog display, monochromatic display, color display, static picture and motion picture.

Figure 7:
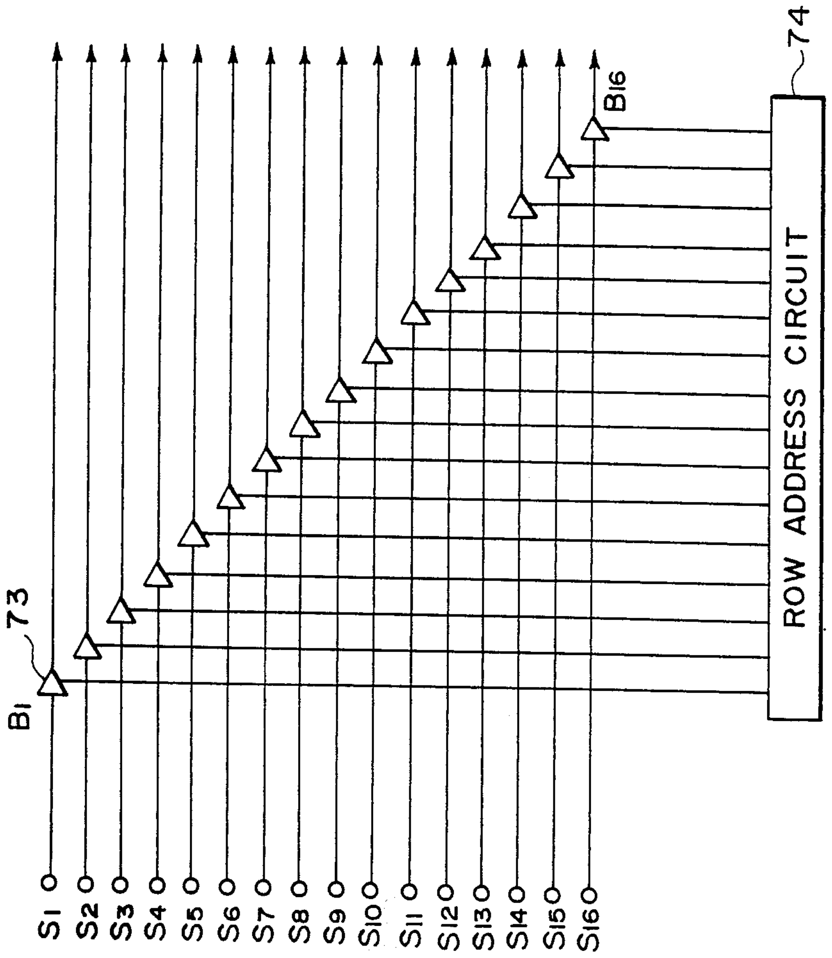
FIGS. 7 and 8 are respectively a partial circuit diagrams of another example of the apparatus according to the present invention.

FIG. 7 is a partial circuit diagram showing another example of output stage of a driver circuit for practicing the invention. It shows a scanning signal output stage wherein signal lines are not divided into blocks. Referring to FIG. 7, buffers 73 include buffers $B_1$–$B_{16}$. Signal lines for which rewriting is desired are selected by row address circuit 74, and then scanning lines $S_1$–$S_{16}$ are driven to effect partial writing.

Figure 8:
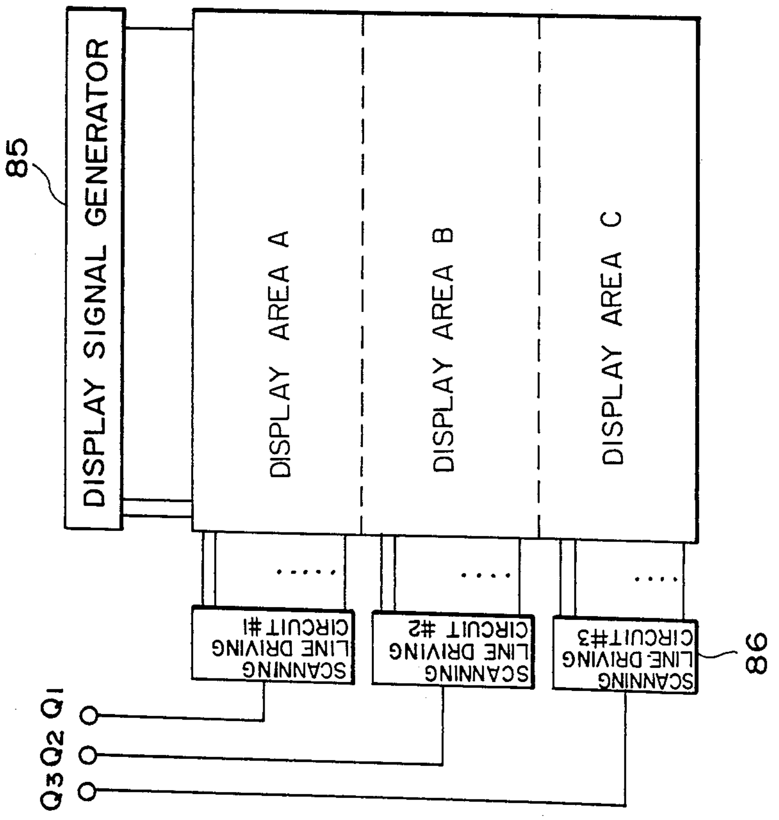

FIG. 8 shows another example of a structural arrangement for practicing the present invention. Referring to FIG. 8, display information signals are generated by a common signal generator circuit 85, and a scanning line circuit 86 is divided into #1–#3 unit circuits for driving display areas, A, B and C, respectively. The scanning line circuits #1–#3 are respectively composed from separate logic circuit units to first select the scanning lines required and then write in the areas A, B and C separately, whereby writing of a large volume of information can be effected at a high speed and at a high density.

Thus, according to the present invention, either one or both of the scanning lines and the signal lines are divided into a plurality of blocks and controlled, whereby only signal lines relating to a block, wherein a picture element to be written in is present, are driven to effect writing. Further, signal lines including scanning lines and signal lines may be divided into a plurality of blocks required for displaying characters including letters and symbols which can be separately controlled to drive only signal lines in a block for writing a letter or symbol as a bit of information.

In another preferred embodiment according to the present invention, when the writing operation comprising the above mentioned first and second steps are carried out for respective blocks, an alternating voltage may be applied to picture elements, after the second step has been completed for an m-th block among M blocks (m and M are integers satisfying $m<M$) each comprising a plurality (n) of lines and before the second step is started for an (m+)-th block. Especially, in the driving method described hereinafter, an alternating voltage may be applied to the picture elements in the non-selected blocks so that the occurrence of crosstalk can be prevented. This driving method will now be described.

Figure 9:
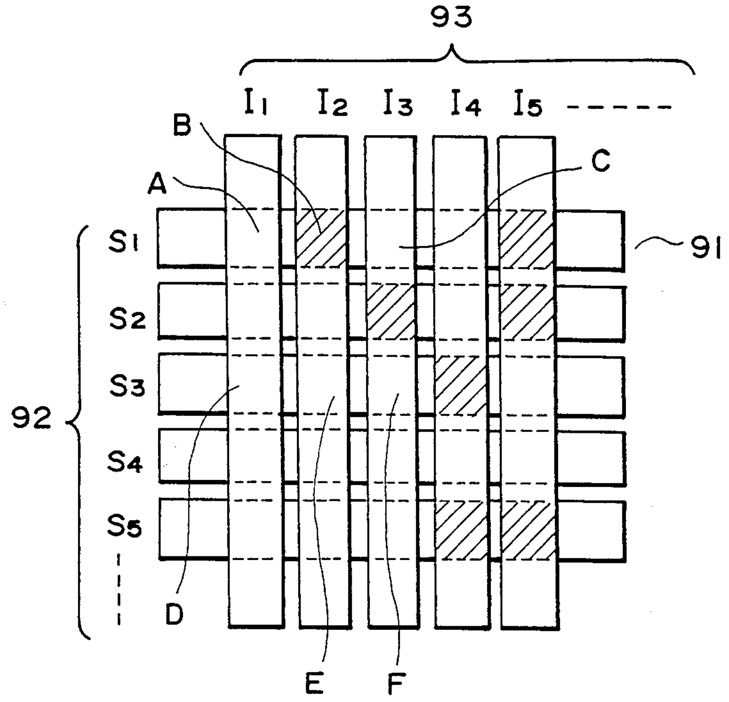
FIG. 9 is a plan view of a matrix picture element arrangement used in the present invention.

Referring to FIG. 9, there is schematically shown an example of a cell 91 having a matrix electrode arrangement in which a ferroelectric liquid crystal material (not shown) is interposed between a pair of groups of electrodes oppositely spaced from each other. Reference numerals 92 and 93 respectively denote a group of scanning electrodes to which scanning signals are applied and a group of signal electrodes to which information signals are applied. For simplifying the explanation, a case wherein binary signals of "white" and "black" are displayed is taken as an example. In FIG. 9, hatched picture elements correspond to "black" based on the second stable state of the ferroelectric liquid crystal and the other picture elements correspond to the first stable state of the ferrolectric liquid crystal.

Figure 10:
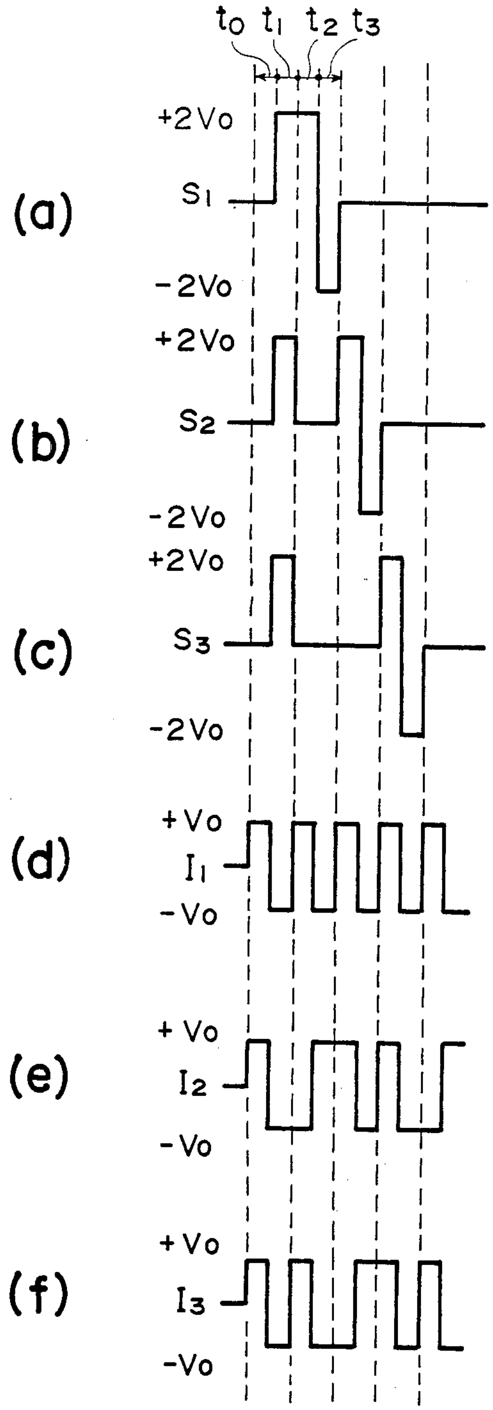
FIG. 10 shows signal voltage waveforms applied to respective electrodes of the present invention.
Figure 11:
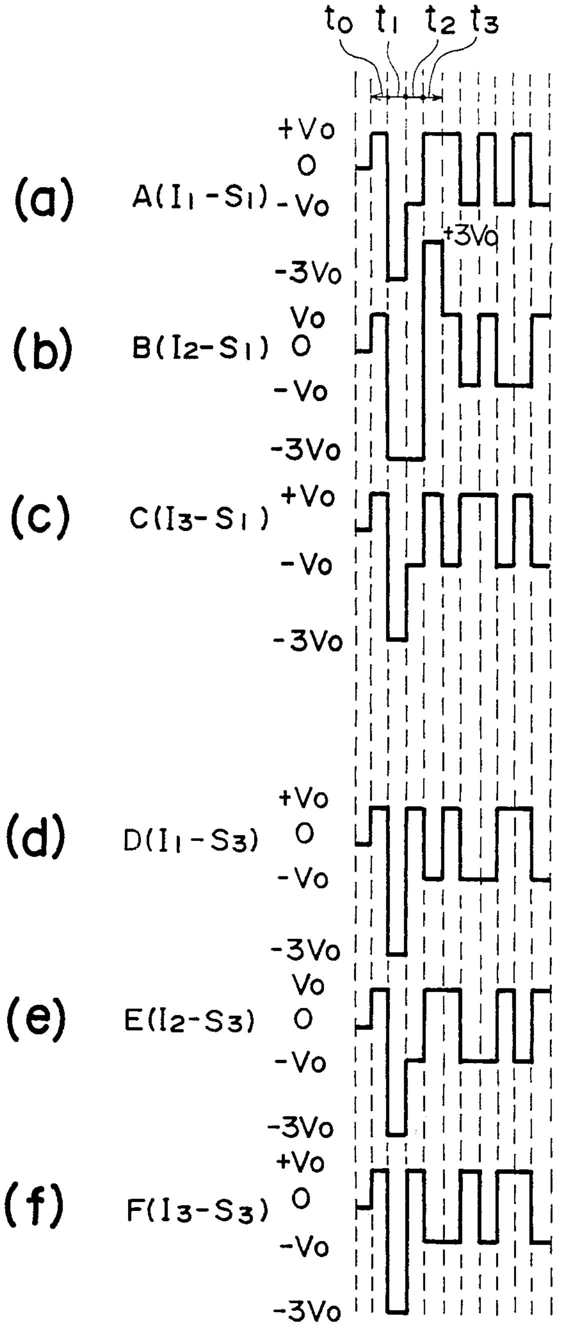
FIG. 11 shows signal voltage waveforms applied to picture elements of the present invention.

FIGS. 10(*a*)–(*c*) show scanning signals applied to scanning electrodes $S_1$–$S_3$, respectively. FIGS. 10(*d*)–(*f*) show information signals applied to signal electrodes $I_1$–$I_3$, respectively. These signals correspond to the display state shown in FIG. 9. FIGS. 11(*a*)–(*f*) show voltages applied to the picture elements A–F, respectively, shown in FIG. 9 in time series. A writing operation explained in FIGS. 10 and 11 is for writing in picture elements in a block consisting of a prescribed number (n) of scanning lines, and such a writing operation is sequentially carried out for a plurality (M) of blocks to effect writing of one picture.

In the driving method shown in FIGS. 10 and 11, all the picture elements on a plurality of scanning lines in a block may be brought to the first stable state ("white" state) at the same time, and then the scanning lines may be sequentially selected to bring desired picture elements to the second stable state ("black" state) to effect writing.

FIGS. 10 and 11 illustrate one mode of the above driving method. In an erasure signal application phase $t_1$, a positive polarity of pulse voltage $2V_0$ is applied to all the scanning lines, and in phase therewith, a negative polarity of pulse voltage $-V_0$ is applied to all the scanning lines, whereby all the picture elements in a block are erased into "white". Then, a scanning selection signal comprising a positive polarity of voltage pulse $2V_0$ and a negative polarity of voltage pulse $-2V$ alternating at writing signal application phase $t_2$ and $t_3$, is sequentially applied to the scanning electrodes in the block. In phase with the scanning selection signal are selectively applied a "white" signal comprising a positive pulse $V_0$ and a negative pulse $-V_0$ alternating at the phases $t_2$ and $t_3$ to the picture elements where the "white" state is to be retained, and a "black" signal comprising a negative pulse $-V_0$ and a positive pulse $V_0$ alternating at the phases to the picture elements where the display state is to be inverted to the "black" state, whereby writing of one block is completed.

In the driving method according to the present invention, prior to applying writing signals to scanning electrodes $I_1$, $I_2$, . . . in phase with the scanning selection signal at phases $t_2$ and $t_3$ for the picture elements in (m+1)-th block, and after writing of the picture elements in m-th block, a voltage signal having an opposite polarity (with respect to a refractive potential) to the voltage signal applied to the scanning electrodes in the erasure signal application phase $t_1$, is applied to the scanning electrodes as an auxiliary signal at an auxiliary signal application phase $t_0$, whereby a voltage below the threshold voltage is applied to the related picture elements. As a result, the continuation of time to which one polarity of voltage is continually applied to picture elements in the non-selected blocks is restricted to twice the writing pulse duration (e.g., when a relation of $t_1=t_2=t_3=t_0$ is assumed) at the maximum, whereby the above mentioned problem of occurrence of crosstalk can be eliminated.

In the above operation, the respective voltage values are set to satisfy the following relationships:

$$2V_0 < V_{th2} < 3V_0, \text{ and}$$

$$-3V_0 < -V_{th1} < -2V_0,$$

wherein $V_{th2}$ is a threshold voltage for the second stable state ("black") of the ferroelectric liquid crystal, $-V_{th}$ is a threshold voltage for the first stable state ("white") of the ferroelectric liquid crystal, and a relation of $|-V_{th1}| \equiv |V_{th2}|$ may be substantially established.

The above operation is explained in further detail hereinbelow.

Figure 12:
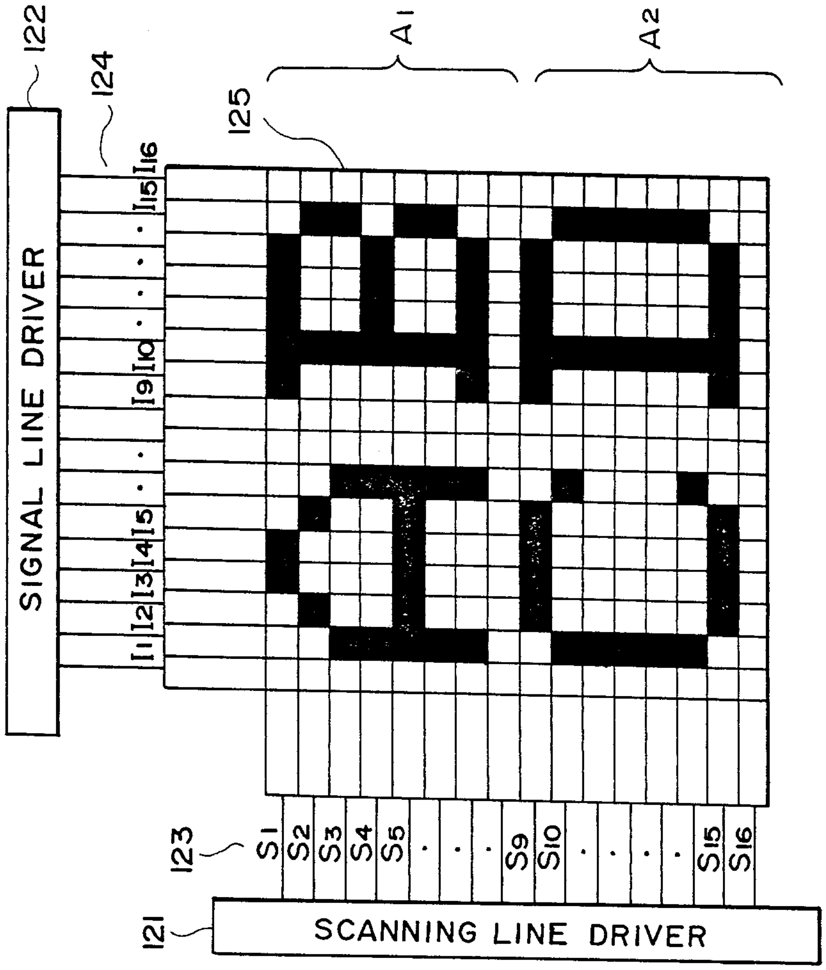
FIG. 12 illustrates an arrangement of one example of the apparatus according to the present invention together with a display state.

FIG. 12 shows a liquid crystal apparatus for carrying out the driving method for driving the picture element. Referring to FIG. 12, a ferroelectric liquid crystal panel 125 comprises scanning electrodes 123 driven by a scanning line driven circuit 121 and signal electrodes 124 driven by a signal line driver circuit 122. In this example, binary signals of "white" and "black" are displayed. Each of the scanning lines and signal lines is assumed to comprise 16 lines. As in FIGS. 4A and 4B, a picture element shown in black represents a "black" state, and a picture element shown in white represents a "white" state. Four characters are displayed by the panel 125 when one character is display by 8×8 picture elements. As shown in FIG. 12, characters "A" and "B" are displayed in an m-th block $A_1$, and characters "C" and "D" in an (m+1)-th block $A_2$.

Figure 13:
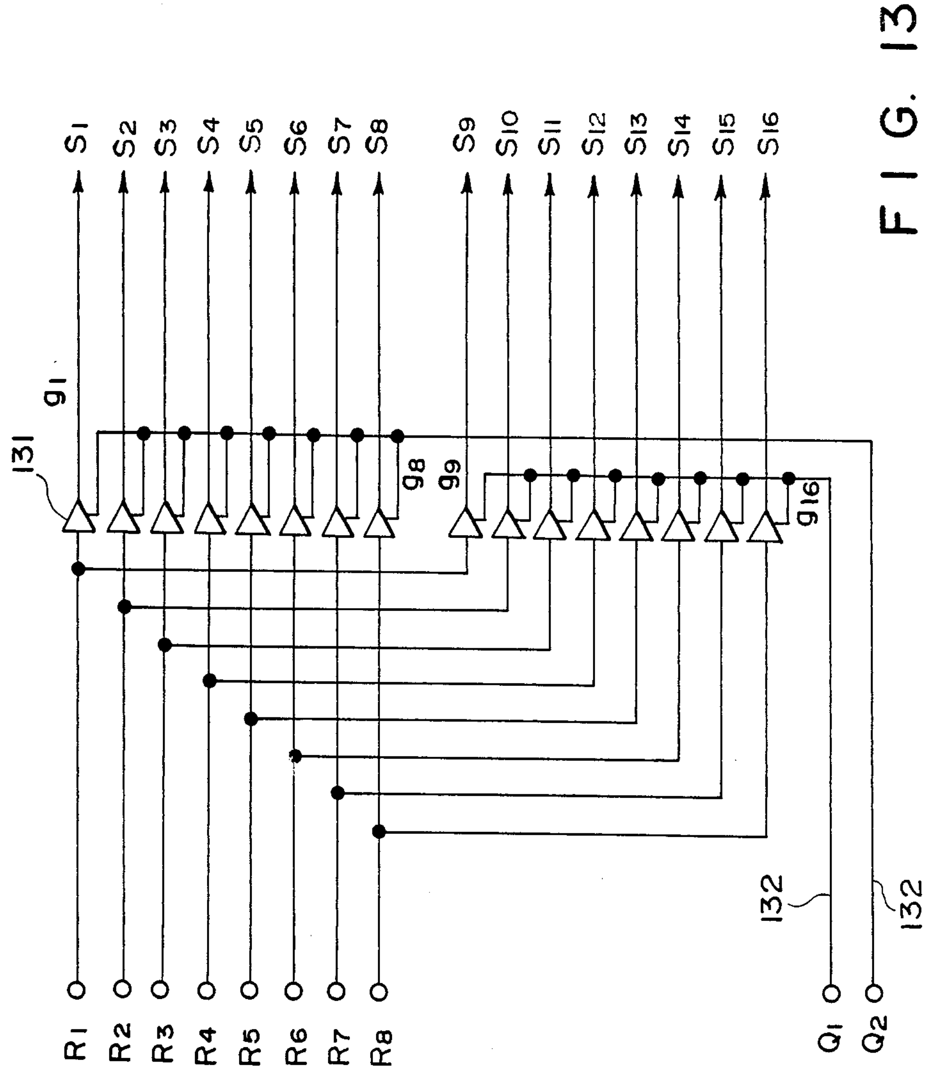
FIG. 13 illustrates a scanning line driven circuit.

FIG. 13 is a partial circuit diagram showing an example of the output stage of the above mentioned scanning line driver circuit 121. Referring to FIG. 13, gate elements $q_1$–$q_N$ (N=16 in this example) are inclusively denoted by reference numeral 131 and the output levels thereof are controlled by selection lines 132. When a terminal $Q_2$ is selected, the gate elements $q_1$–$q_8$ are simultaneously turned on to transfer the levels of the terminals $R_1$–$R_8$ as they are, while the output lines $S_1$–$S_8$ are held at a prescribed constant level for maintaining the panel 125 in the non-selected state when the terminal $Q_2$ is not selected. The terminal $Q_1$ has the same function as the terminal $Q_2$ for the gate elements $q_9$–$q_{16}$.

Figure 14:
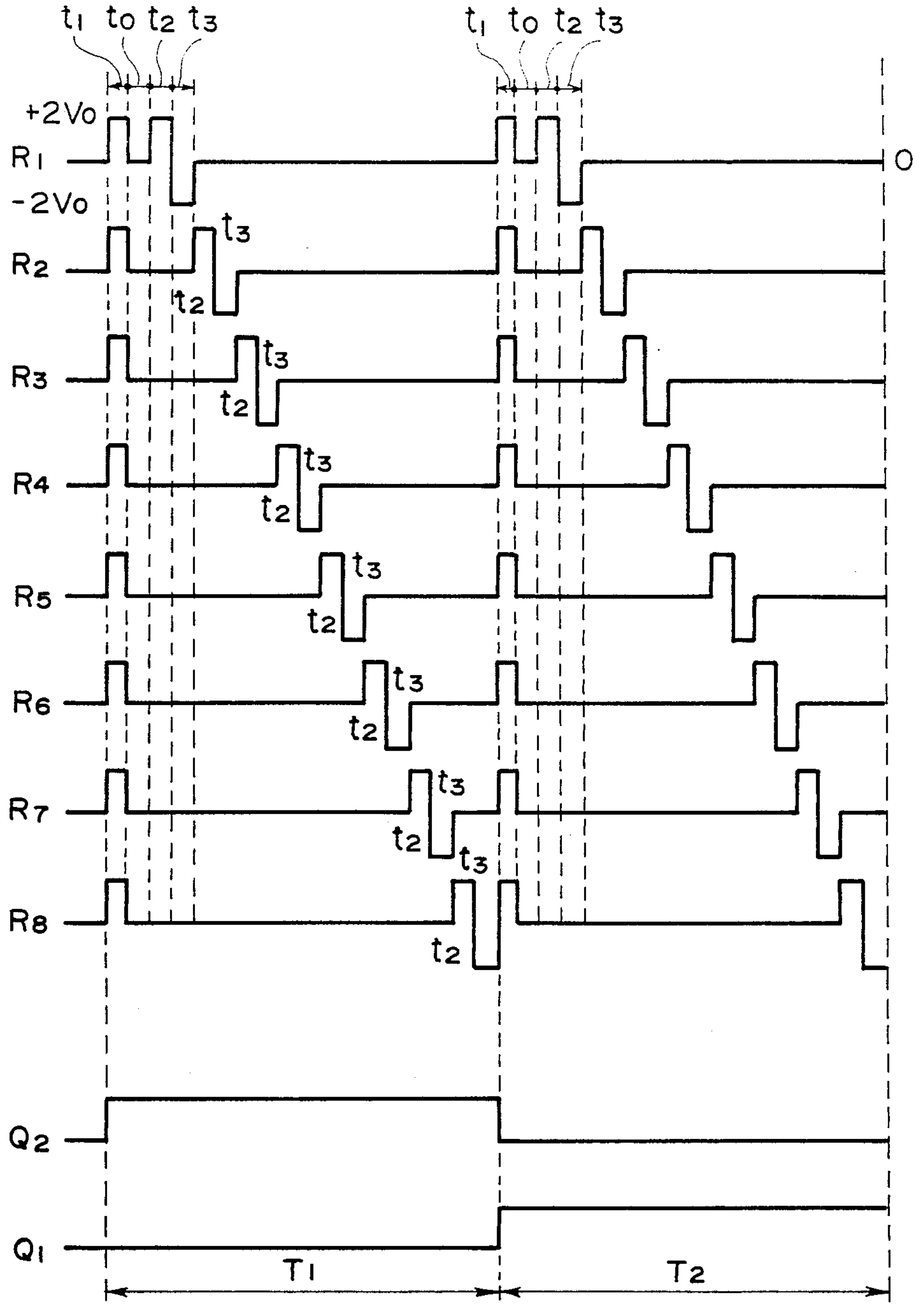
FIG. 14 is a signal time chart therefor.

FIG. 14 is a timing chart of the above mentioned output stage. In an example shown in FIG. 14, the picture elements in a block have sequentially applied to them; an erasure signal; an auxiliary signal; and a writing signal at phases $t_1$, $t_0$, and $t_2+t_3$ for the respective signals, whereby writing in an m-th block is effected in a writing period $T_1$ and writing in an (m+1)-th block in a writing period $T_2$ (e.g., $T_1=T_2$).

Figure 15:
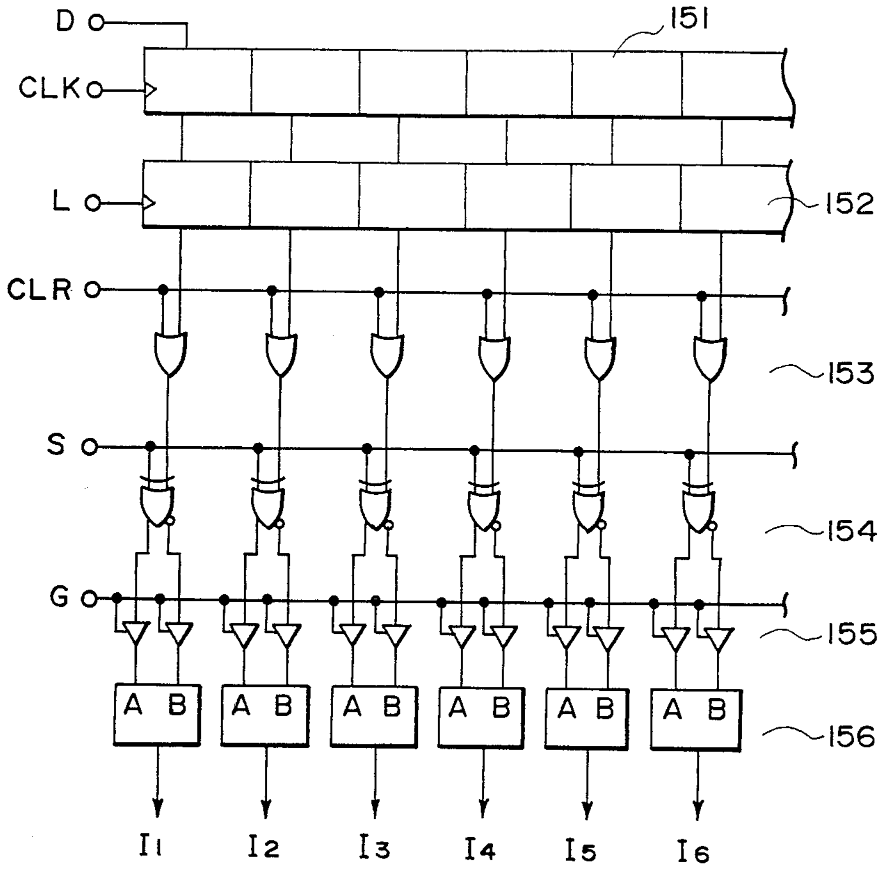
FIG. 15 illustrates a signal line driver circuit.
Figure 16:
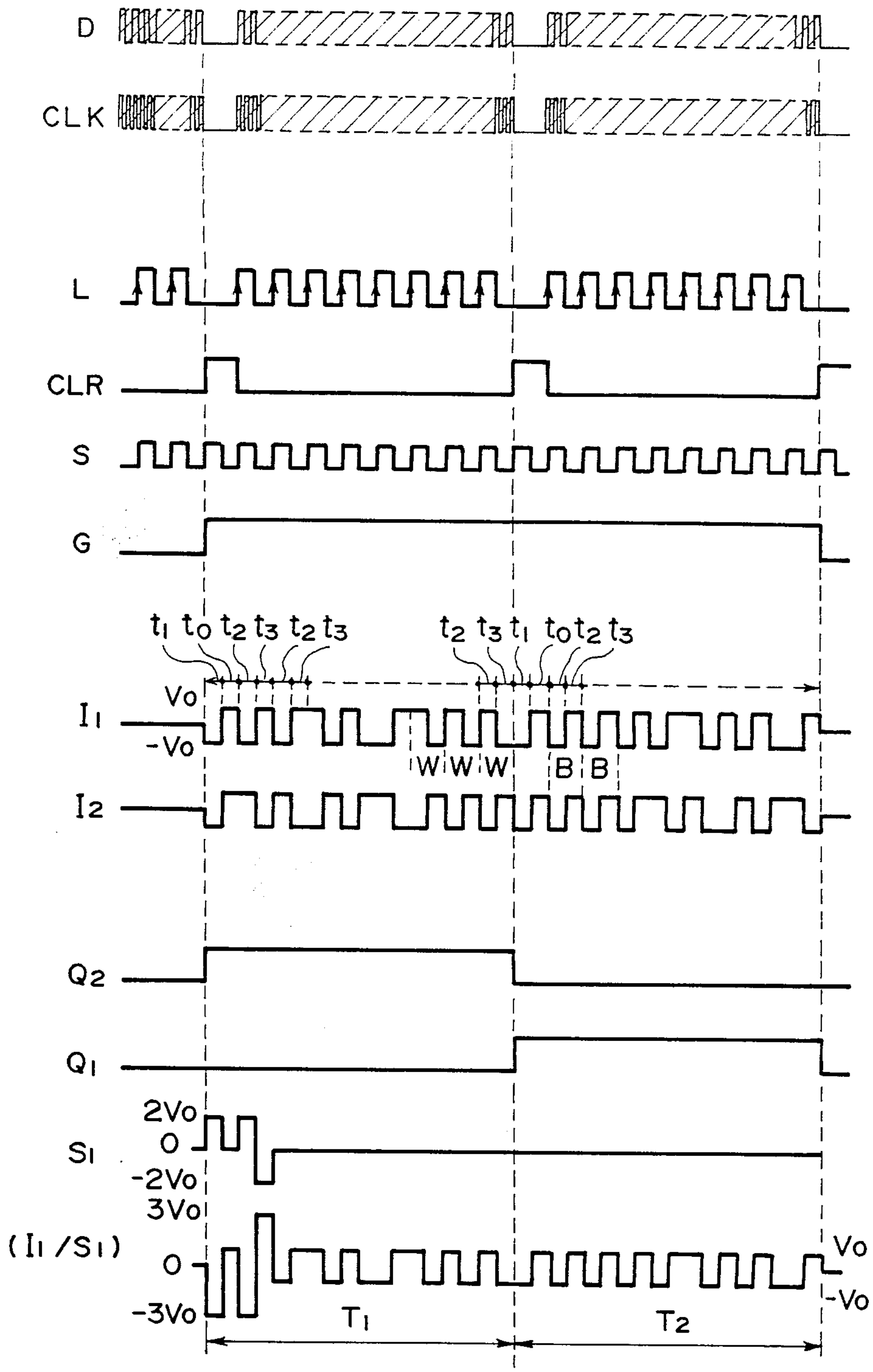
FIG. 16 is a signal time chart therefor.

FIG. 15 is a partial circuit diagram showing an example of the output stage of the signal line driver circuit 122 and FIG. 16 is a timing chart therefor. Referring to FIG. 15, D is a serial input terminal for data (e.g., image signals; corresponding to those shown at D in FIG. 16), CLK is an input terminal for shift clock pulses. When all data are collected at a shift register 151, the potential of the L terminal rises from 0 to 1 so that data are latched by a latch 152. Up to now, the operation is not different from one of an ordinary information driver circuit.

A characteristic of this example of the driving system is that subsequent to the latches, OR gates 153 are provided to produce OR outputs between the latch outputs and CLR signals. The CLR signals are ordinarily 0, so that the latch outputs are transferred to EOR (exclusive OR) gate 154. S signals are simple repeating pulses of 1 and 0, so that the pulses of 1 and 0 are output as they are to the positive logic output terminals and the inverted pulses thereof are output to the negative logic output terminals, when the latch outputs (i.e., image signals) are 0 ("black"). On the other hand, when the latch outputs are 1 ("white"), the inverted pulses of the S pulses are output to the positive logic output terminals and the S pulses are output as they are to the negative logic terminals. These signals enter an array of gates 155 controlled by a G terminal, and the outputs thereof are transferred to level converters 156. The level converters output three values of GND, $-V_0$ and $+V_0$ corresponding to the inputs of A and B as shown in Table 1 below.

TABLE 1

| A | B | $I_n$ |
|---|---|---|
| L | L | GND |
| L | H | $-V_0$ |
| H | L | $+V_0$ |

More specifically, as will be understood from the circuit of FIG. 15, the following outputs are attained:

in case of G=1 (gate open), $+V_0 \rightarrow -V_0$, if the image signal is "black", $-V_0 \rightarrow +V_0$, if the image signal is "white", and in case of G=0 (gate closed), GND, regardless of the image signal.

Hereinabove, the case of CLR=0 has been explained. However, in the initial period ($t_0$ and $t_1$) of a block scanning operation, a case of CLR=1 occurs. In this case, all the outputs of the OR gates are 1, and all the outputs of the level converters $-V_0 \rightarrow +V_0$. As a result, prior to the block scanning operation, a voltage signal of $-V_0 \rightarrow +V_0$ is applied to all the signal lines, whereby a desired driving mode is realized. However, a voltage signal of $-3V_0 \rightarrow +V$ is applied to picture elements in the related scanning block.

Figure 17:
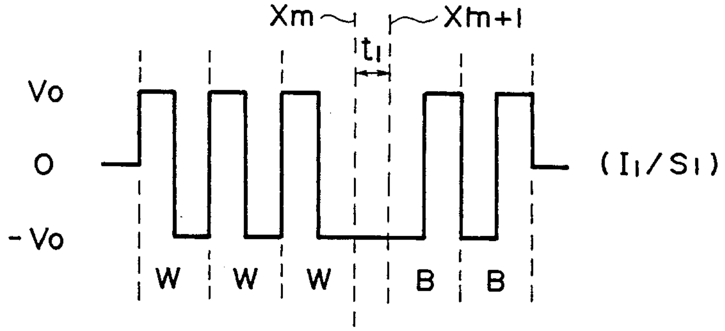
FIG. 17 illustrates a waveform when an auxiliary signal has been omitted.

For the purpose of comparison, FIG. 17 shows an example wherein an auxiliary signal application phase $t_0$ used in the above example is omitted.

More specifically, FIG. 17 shows an example of a pulse waveform applied to a signal electrode. $X_m$ denotes a time of completion of m-th block scanning, and $X_{m+1}$ denotes a starting time of (m+1)-th block scanning. The negative pulse between $X_m$ and $X_{m+1}$ corresponds to the negative pulse applied in the erasure signal application phase $t_1$ as mentioned above and is used for simultaneously writing "white" in the (m+1)-th block. In this example, the last signal for the m-th block operation is a "white" signal comprising a positive pulse and a negative pulse in this order at phases $t_2$ and $t_3$, and the first signal for the (m+1)-th block operation is a "black" signal comprising a negative pulse and a positive pulse in this order at phases $t_2$ and $t_3$. When these signals are applied, as shown in FIG. 17, three negative pulses are consecutively applied around the phase $t_1$ to picture elements on non-selected lines. This means that the continuation of time in which one polarity of voltages (below the threshold) is continually applied to non-selected picture elements can be three times the writing pulse duration in a driving method using a block division while the continuation of time is two times the writing pulse duration at the maximum in a driving method using no block division. This sometimes causes an inversion of a non-selected picture element, i.e., so-called "crosstalk", as a problem accompanying a display operation. The present invention eliminates this problem to provide a driving method which prevents occurrence of crosstalks.

As explained hereinabove, the present invention provides a driving method for an optical modulation device which can be used as a display device of a large picture area having a high reliability while providing a high density and a high speed operation, shortening the writing time, minimizing driving power consumption, and realizing a prolonged life of the device.

Further, according to the present invention, when a display panel using a ferroelectric liquid crystal device is driven at a high speed, the maximum pulse duration of the voltage continually applied to a picture element is restricted to two times the writing pulse duration ΔT, both for a picture element in non-selected blocks and a picture element to which a scanning selection signal is not applied. As a result, the phenomenon that a display state is inverted into another state during the course of scanning for writing one picture can be effectively prevented.

What is claimed is:

1. A liquid crystal apparatus comprising:

a plurality of scanning electrodes;

a plurality of signal electrodes intersecting the scanning electrodes;

a ferroelectric liquid crystal disposed between the scanning electrodes and signal electrodes and having at least two orientation states depending on the electric field applied thereto; and driving means for driving said plurality of scanning electrodes and said plurality of signal electrodes, said driving means including:

means for dividing the plurality of scanning electrodes into a plurality of blocks, each block comprising a plurality of signal electrodes and a plurality of scanning electrodes, wherein the number of scanning electrodes in each block is smaller than the total number of scanning electrodes; and voltage application means for sequentially selecting a block from the plurality of blocks, applying a voltage to said apparatus to orient the forroelectric liquid crystal at the intersections of the plurality of signal electrodes and the plurality of scanning electrodes in the selected block in a first orientation state, sequentially applying a scanning selection signal to said apparatus for selecting a scanning electrode from the plurality of scanning electrodes in the selected block, and applying a voltage to said apparatus to orient the ferroelectric liquid crystal at the intersection of a selected signal electrode from the plurality of signal electrodes and the selected scanning electrode to a second orientation state.

2. A liquid crystal apparatus according to claim 1, wherein said scanning selection signal applied by said voltage application means has a single voltage of one polarity with respect to the voltage level of non-selected scanning electrodes.

3. A liquid crystal apparatus according to claim 2, wherein, in phase with the single voltage of one polarity, said voltage application means selectively applies a voltage of said one polarity and a voltage of the other polarity, with respect to the voltage level of the non-selected scanning electrodes, to the plurality of scanning electrodes.

4. A liquid crystal apparatus according to claim 1, wherein said scanning selection signal applied by said voltage application means has a single voltage of one polarity with respect to and a voltage at the same level as the voltage level of the non-selected scanning electrodes.

5. A liquid crystal apparatus according to claim 4, wherein said voltage application means selectively applies to said apparatus a voltage of said one polarity and a voltage of the other polarity in phase with said single voltage of one polarity, and wherein said voltage application means applies to the plurality of signal electrodes voltages of polarities opposite to the polarities of the voltage of one polarity and the voltage of the other polarity, respectively, in phase with said voltage at the same level, the voltage polarities being defined with respect to the voltage level of the non-selected scanning electrodes.

6. A liquid crystal apparatus according to claim 1, wherein said scanning selection signal applied by said voltage application means has a bipolar voltage comprising a voltage of one polarity and a voltage of the other polarity with respect to the voltage level of the non-selected scanning electrodes.

7. A liquid crystal apparatus according to claim 6, wherein said voltage application means selectively applies, in phase with the bipolar voltage, a voltage of the same phase as and a voltage of the opposite phase to the bipolar voltage, to the plurality of signal electrodes.

8. A liquid crystal apparatus according to claim 1, wherein said voltage application means applies the voltage orienting the ferroelectric liquid crystal to the first orientation state and to the second orientation state block-by-block.

9. A liquid crystal apparatus according to claim 1, wherein said voltage application means applies the voltage orienting the ferroelectric liquid crystal to the first orientation state simultaneously at the intersections of the plurality of signal electrodes and the plurality of scanning electrodes in the selected block.

10. A liquid crystal apparatus according to claim 1, wherein said voltage application means applies an alternating voltage to the intersections of the plurality of signal and scanning electrodes on the plurality of scanning electrodes in a non-selected block.

11. A liquid crystal apparatus according to claim 10, wherein said alternating voltage comprises a bipolar AC voltage with respect to the voltage level of the non-selected scanning electrodes.

12. A liquid crystal apparatus according to claim 1, wherein said voltage application means includes a scanning electrode driver circuit for driving the plurality of scanning electrodes and a signal electrode driver circuit for driving the plurality of signal electrodes, and wherein the scanning electrode driver circuit comprises a plurality of gate elements each connected to one of the plurality of scanning electrodes, a plurality of control lines each connected to a predetermined number of the gate elements, and means for sequentially applying a switching signal to the plurality of control lines.

13. A liquid crystal apparatus according to claim 12, wherein said signal electrode driver circuit comprises a latch and an OR gate for issuing an OR output between the output of the latch and a clock pulse signal applied thereto.

* * * * *

UNITED STATES PATENT AND TRADEMARK OFFICE
CERTIFICATE OF CORRECTION

PATENT NO. : 4,778,260

DATED : October 18, 1988

INVENTOR(S) : SHINJIRO OKADA, ET AL.

It is certified that error appears in the above-identified patent and that said Letters Patent is hereby corrected as shown below:

ON THE TITLE PAGE,
IN [30] FOREIGN APPLICATION PRIORITY DATA

Insert --Mar. 13, 1986 [JP] ............. 61-052264--.

COLUMN 1

Line 16, "small scale" should read --small-scale--.
Line 25, "propoed" should read --proposed--.
Line 27, "U.S. Pat. No. 4367924," should read --U.S. Pat. No. 4,367,924,--.

COLUMN 2

Line 47, "relationship" should read --relation--.

COLUMN 3

Line 1, "a" should be deleted.
Line 9, "invention," should read --invention;--.
Line 13, "circuit, and" should read --circuit;--.
Line 15, "circuit, and" should read --circuit;--.
Line 40, ""Submicro Second" should read --"Submicrosecond--.
Line 52, "materals," should read --materials,--.
Line 65, "ITO (Indium Tim Oxide)," should read --ITO (indium tin oxide),--.

UNITED STATES PATENT AND TRADEMARK OFFICE
CERTIFICATE OF CORRECTION

PATENT NO. : 4,778,260

DATED : October 18, 1988

INVENTOR(S) : SHINJIRO OKADA, ET AL.

It is certified that error appears in the above-identified patent and that said Letters Patent is hereby corrected as shown below:

COLUMN 5

Line 10, "tht" should read --that--.
Line 34, "is" should read --will be--.
Line 56, "so only" should read --so that only--.

COLUMN 6

Line 36, "are" should read --is--.
Line 42, "(m+)-th block." should read --(m+1)-th block--.

COLUMN 7

Line 22, "phase $t_2$ and $t_3$," should read --phases $t_2$ and $t_3$,--.
Line 59, "$-V_{th}$" should read -- $-V_{th1}$ --.

COLUMN 8

Line 9, "display" should read --displayed--.
Line 31, "them;" should read --them:--.

COLUMN 9

Line 45, "ages" should read --age--.
Line 55, "crosstalks." should read --crosstalk.--.

UNITED STATES PATENT AND TRADEMARK OFFICE

CERTIFICATE OF CORRECTION

PATENT NO. : 4,778,260

DATED : October 18, 1988

INVENTOR(S) : SHINJIRO OKADA, ET AL.

It is certified that error appears in the above-identified patent and that said Letters Patent is hereby corrected as shown below:

COLUMN 10

Line 27, "forroe-" should read --ferroe- --.
Line 51, "scan-" should be deleted.
Line 52, "ning" should read --signal--.

Signed and Sealed this

Fifteenth Day of May, 1990

*Attest:*

HARRY F. MANBECK, JR.

*Attesting Officer*

*Commissioner of Patents and Trademarks*